(12) United States Patent
Ferguson et al.

(10) Patent No.: US 7,206,852 B2
(45) Date of Patent: Apr. 17, 2007

(54) SYSTEM AND METHOD FOR UPGRADING SOFTWARE IN A DISTRIBUTED COMPUTER SYSTEM

(75) Inventors: Donald F. Ferguson, Yorktown, NY (US); Anand Byrappagari, Pittsburgh, PA (US); Graeme Dixon, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/190,577

(22) Filed: Jul. 27, 2005

(65) Prior Publication Data

US 2006/0031420 A1 Feb. 9, 2006

Related U.S. Application Data

(63) Continuation of application No. 09/675,790, filed on Sep. 29, 2000, now Pat. No. 6,976,079.

(51) Int. Cl.
*G06F 15/16* (2006.01)

(52) U.S. Cl. ............... 709/229; 709/203; 709/217; 717/168; 717/169; 717/170; 718/104

(58) Field of Classification Search ......... 709/203, 709/217, 219, 229; 717/168–172
See application file for complete search history.

(56) References Cited

U.S. PATENT DOCUMENTS

| 5,504,894 | A |  | 4/1996 | Ferguson et al. ......... 395/650 |
| 5,987,376 | A |  | 11/1999 | Olson et al. ............... 701/201 |
| 6,006,034 | A | * | 12/1999 | Heath et al. ............... 717/170 |
| 6,014,700 | A |  | 1/2000 | Bainbridge et al. ........ 709/226 |
| 6,041,357 | A |  | 3/2000 | Kunzelman et al. ....... 709/228 |
| 6,058,424 | A |  | 5/2000 | Dixon et al. ............... 709/226 |
| 6,076,108 | A |  | 6/2000 | Courts et al. .............. 709/227 |
| 6,088,728 | A |  | 7/2000 | Bellemore et al. ......... 709/227 |
| 6,397,385 | B1 | * | 5/2002 | Kravitz ....................... 717/173 |
| 6,453,468 | B1 | * | 9/2002 | D'Souza ..................... 717/168 |
| 6,622,159 | B1 | * | 9/2003 | Chao et al. ................. 709/203 |
| 6,675,382 | B1 | * | 1/2004 | Foster ........................ 717/177 |
| 6,976,079 | B1 | * | 12/2005 | Ferguson et al. ........... 709/229 |
| 7,003,767 | B2 | * | 2/2006 | Larkin ........................ 717/172 |

* cited by examiner

*Primary Examiner*—Ario Etienne
*Assistant Examiner*—LaShonda Jacobs
(74) *Attorney, Agent, or Firm*—Synnestvedt & Lechner, LLP; J. S. Ray-Yarletts

(57) ABSTRACT

A method for upgrading one of several computer programs stored on an application server in a distributed computing environment while permitting the application server to continue to service requests for other computer programs. In accordance with the method, the application server is prevented from receiving any new requests for the computer program. The system then waits until all current requests serviced by the application server for that computer program have ended. Then, after acknowledging completion of upgrading of the computer program, the application server is permitted to receive any new requests for the computer program. Apparatuses for carrying out the inventive method are provided.

3 Claims, 4 Drawing Sheets

SYSTEM AND METHOD FOR UPGRADING SOFTWARE IN A DISTRIBUTED COMPUTER SYSTEM

CROSS-REFERENCE TO RELATED APPLICATION

This application is a continuation of U.S. application Ser. No. 09/675,790, filed Sep. 29, 2000 now U.S. Pat. No. 6,976,079, the entire disclosure of which is hereby incorporated herein by reference.

FIELD OF THE INVENTION

The present invention relates generally to the field of client/server (also known as "distributed") computer systems. In particular, the present invention relates to a system and method for upgrading software, e.g., on a server, in a distributed computer system.

BACKGROUND OF THE INVENTION

The client/server computing model is a distributed computing model allowing a client process running on a client computer (a "client"), to delegate some of its work to a server process running on a server computer (a "server"). Distributed computer systems typically use multiple servers to provide essential functions to multiple users' clients in multiple concurrent user sessions. The use of multiple servers improves server availability and system capacity. It is often essential that distributed computer systems provide service on a continuously available, uninterrupted basis. However, distributed computer systems require periodic maintenance, including software upgrades.

FIG. 1 illustrates an exemplary distributed communications system 10 of the prior art. The system 10 includes three clients 12, 14, 16 connected to a communications network 18, e.g. the Internet or an intranet. Also connected to the communications network 18 is a server cluster 20 including application servers 22, 24 and 26. Each application server in the server cluster 20 stores an identical or nearly identical set of computer software programs and components thereof (collectively, "software"). Such software either enables a server to perform processes and/or interact with clients or is application software stored to be served to clients. An older version of such software is periodically replaced with a newer version providing new or more reliable functionality. This "upgraded" software must typically be installed on multiple servers in the distributed system.

In operation, individual clients use software applications stored on the application servers by sending data packets among one another via the communications network. Clients send messages, or "requests" for the software and receive response messages from the servers. Individual requests are part of a "session." Application software starts and ends sessions. Since individual client's requests within a session may be routed to different application servers in the server cluster, some mechanism for sharing the session information is necessary. Various methods, both hardware and software based, are well known for sharing such information, including allowing access to shared memory or databases, and broadcasting session updates to all application servers in the cluster. For example, such information is typically stored in shared storage on an external data server 28.

Each application server maintains a list of active client sessions (the "Active Session List") that it is currently supporting. Effectively, each entry in the Active Session List stores a unique session identification code ("session ID") and associated session data for each client session. When an application server detects a new client session, it writes a new entry to the Active Session List. At the end of a request, associated session data is written to the client. Additionally, each application server stores information reflecting an active session count reflecting the number of active sessions being supported.

Preferably, such Active Session Lists from each application server are compiled into a Session List maintained in a shared storage area, such as at an external data server 28 for returning data to the clients, as is well known in the art. When a next request from the client is to be serviced by a different application server, that application server reads the session ID from the Session List. The basic execution model is: receive client request, load session data from the Session List, process request, return response, write session to Session List.

The application servers in the server cluster 20 are connected to the communications network 18 via a router 30. The router 30 and/or network routing layer functions in a well known manner, operating to distribute clients' requests among the multiple application servers.

A system management server 32 is connected to the router 30 and each of the applications servers. The system management server stores a mapping of applications/software programs to application servers (the "Server List"). This mapping information is accessed by the router to complete routing functions. The system management server provides configuration and health/load information to the router of the communications network 18.

There are several known architectures for distributed computer systems. One known example is the Java 2 Enterprise Edition specification of a client/server architecture (Java 2 Enterprise Edition™ is a trademark of Sun Microsystems, Inc.). The Java 2 Enterprise Edition™ specification allows server vendors to support seamless migration of all ongoing client sessions from a first server to a second server to permit the first server to be removed from the distributed computer system or by-passing an unscheduled server failure without aborting a pending client session. FIG. 2 shows an exemplary flow diagram 50 depicting the process of upgrading software in the distributing computing system of FIG. 1.

As shown in FIG. 2, the upgrade process begins with maintenance of the Session List and Server List, as shown at steps 51 and 52. There are many well known techniques for maintaining the Session List and Server List. Next, at step 54, an application server storing software to be upgraded is identified, e.g., Application Server 1. For example, the application server may be identified by reference to the Server List maintained in step 52.

The system management server 32 then forbids the router to route client requests to Application Server 1, as shown at step 56, thereby removing Application Server 1 from active service during the upgrade procedure. For example, the system management server 32 may send a signal to the router 30 with an appropriate message to cause the router 30 to stop sending new requests which could be serviced by the application server being upgraded. This may require an addition, deletion or modification to the Server List stored at the router and/or the system management server.

The system management server 32 then monitors whether the application server is currently supporting any active client requests, as shown at step 58. For example, the system management server may send an appropriate signal to the application server to determine if the active session count is 0. If the application server is still supporting active client requests (i.e., the active session count is greater than 0), the system management server waits or continues polling, as shown at step 60. This continues until the active session count drops to 0, indicating that the application server is no longer supporting any active client requests. Since the router will send no new requests to Application Server 1 and the current sessions have ended, Application Server 1 is effectively removed from the distributed computing system.

At this point, Application Server 1's software may be upgraded without disrupting any pending client requests. When the application server is no longer supporting any client requests, the appropriate software program on the appropriate application server is upgraded, as shown in step 62. Methods and computer hardware and software for upgrading software are well known in the art.

Once the upgrade is complete, the system management server 32 then permits the router 30 to route new client requests to the Application Server 1, as shown at step 64. This may be achieved by addition, deletion or modification of the Server List. For example, step 64 may be performed responsive to a signal sent from Application Server 1 to the system management server to indicate that the upgrade is complete. Finally, the method ends, as shown at step 65. In effect, the application server is added back to the distributed computing system.

Accordingly, prior art methods remove all of an application server's resources from a distributed computing system in order to update a single software application, which may constitute a small fraction of the application server's stored applications. Accordingly, the distributed computer system's burden is increased during a software upgrade process because the system must service client's requests with one fewer application server.

SUMMARY OF THE INVENTION

The present invention provides a system and method for upgrading software in a distributed computer system. Specifically, the present invention provides a system and method for selectively redirecting or "migrating" only client sessions for the to-be-upgraded software. This is achieved by modifying software at the application server(s) and the system management server to cause the Server List to track servers capable of handling requests on the basis of each individual piece of software, and to cause the Session List to track requests on the basis of each individual piece of software. Accordingly, requests for only a specific piece of software can be migrated when only a small portion of an application server's resources need to be upgraded, the remainder of the application server's resources remaining available to the distributed computing system. In other words, the application server on which the software being upgraded resides can continue servicing requests for other pieces of software. As compared with prior art methods, the present invention reduces the burden on the distributed computing system during a software upgrade process.

In accordance with the method, the application server is prevented from receiving any new requests for a particular computer program that needs to be upgraded. This is achieved by maintaining a mapping of computer programs to application servers and for a given server, instructing a router not to send requests for the particular computer program to the given server. The system then waits until all current requests serviced by the application server for that computer program have ended. This is achieved by tracking active client requests on the basis of each computer program; for the particular computer program, it is determined whether any client requests are currently active. Then, after acknowledging completion of upgrading of the computer program, the application server is permitted to receive any new requests for the computer program. For example, the application server may inform the system management server that the upgrade is complete, at which time the system management server instructs the router that it may resume routing client requests for the particular computer program to the upgraded application server.

In one embodiment of the present invention, the system management server includes software for systematically upgrading a plurality of servers so that the upgrade process "ripples" across the distributed computing system by refusing requests for the to-be-upgraded software sequentially for multiple servers.

Apparatuses for carrying out the inventive method are provided.

DETAILED DESCRIPTION

The present invention provides a system and method for upgrading software in a distributed computer system including an application server storing to-be-upgraded software. Prior art techniques tracked application server usage on a session basis and required an entire application server to be "quiesced", i.e., placed on an inactive status such that no new clients' requests for software stored by that application server could be routed to that application server during the upgrade process. Accordingly, the quiesced application server could not service any clients' requests. The present invention provides a system and method for permitting limited quiescence of an application server by tracking application server usage on a per application basis. Accordingly, an application server storing several software programs is permitted to continue servicing clients requests for software programs other than the to-be-upgraded software program while the to-be-upgraded software is upgraded. Only clients' requests for the to-be-upgraded software are routed away from the application server during the upgrade process. Accordingly, when only one software program stored on the application server needs to be upgraded, the remainder of the software programs stored on the application server remain available to the distributed computing system. As compared with prior art methods, the present invention therefore reduces the burden on the distributed computing system during a software upgrade process.

Figure 1:
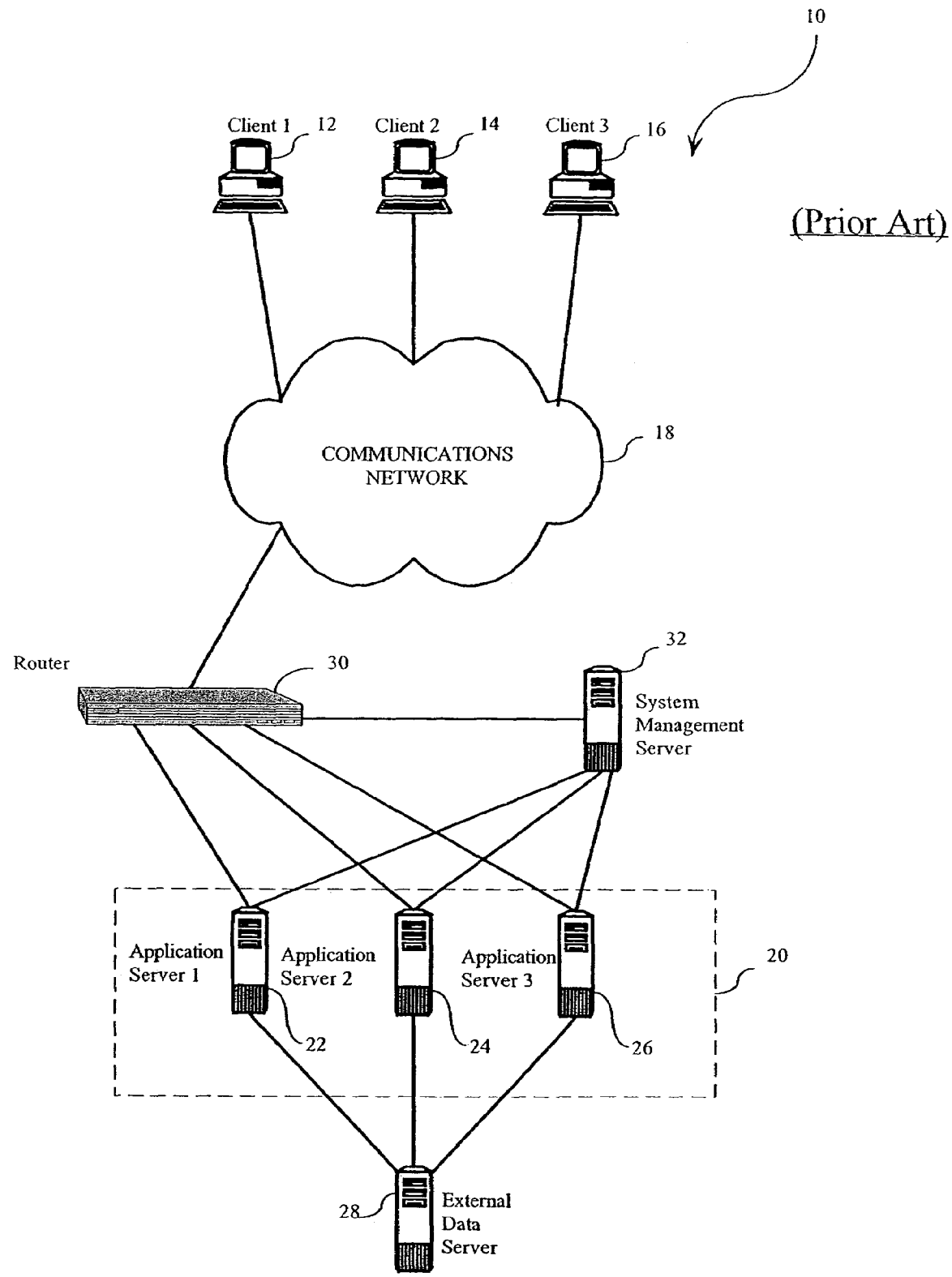
FIG. 1 a block diagram of a distributed computing system in accordance with the prior art.
Figure 2:
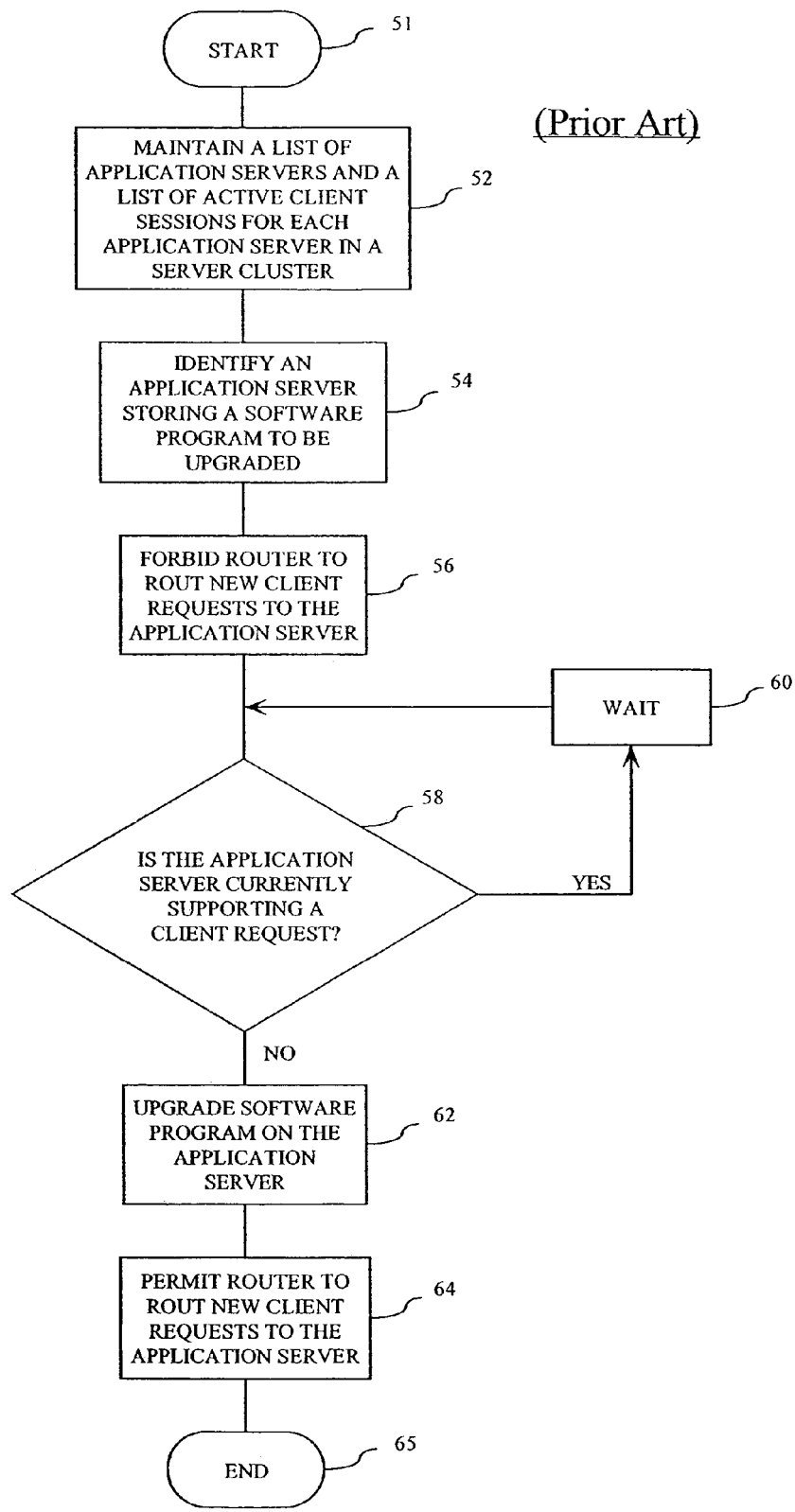
FIG. 2 is an exemplary flow diagram of a software upgrade method in accordance with the prior art.
Figure 3:
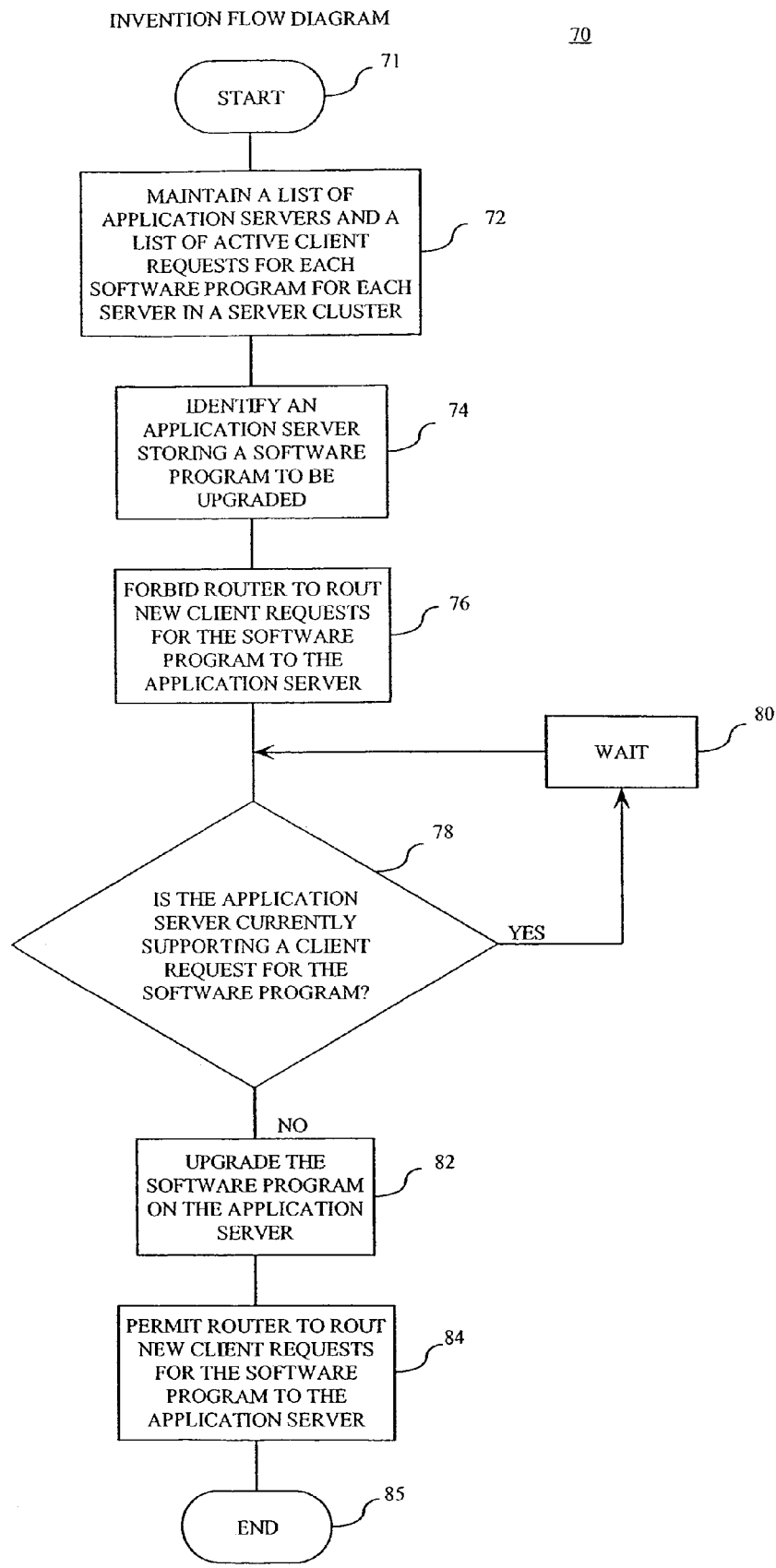
FIG. 3 is an exemplary flow diagram of a software upgrade method in accordance with the present invention.

FIG. 3 is an exemplary flow diagram 70 of a software upgrade method in accordance with the present invention. As shown in FIG. 3, the method begins with maintenance of a Session List and Server List, as shown at steps 71 and 72. This step differs from the prior art in that each entry in the Session List includes identification of the software program associated with the request, i.e., a mapping of each active request to each application. In one embodiment, the Session List is maintained only at each application server. In another embodiment, each application server's request list compiled into a master Session List at the external data server or in other shared storage. Any embodiment in which it is apparent when the application server is no longer servicing a client's request for the computer program is suitable.

Additionally, each entry in the Server List includes identification of the software programs on each application server, i.e., a mapping of each application to each application server. The Server List is preferably stored at the system management server and is used to provide the router 30 with a mapping of applications to application servers. This requires modification of software at the application servers and the system management server to track request/session information on a per application basis. For example, in the Internet context, the Session List may include a mapping of URL's for each software program to each server. Such mapping information is also stored in the Server List stored by the system management server. Alternatively, each software program may be identified by filename, transaction code, etc.

An application server storing the to-be-upgraded ("TBU") software is then identified, as shown at step 74. This may be accomplished with or without human intervention, e.g., by observing which software programs are stored on a computer and checking for the to-be-upgraded software. Alternatively, an application server may be identified in an automated fashion by maintaining a database of software programs stored on each application server, the database being referenced by a software program for systematically checking and upgrading each application server in a server cluster, etc. For example, such a software program may be stored and executed at the system management server.

Conceptually, once the TBU software has been identified at step 74, the router 30 is then forbidden to rout new client requests for the TBU software program to the to-be-upgraded application server, as shown at step 76. This step may be implemented, for example, by sending an appropriate signal to the router 30 to indicate that requests for certain URL's cannot be routed to the TBU application server and/or by making an appropriate entry in the Server List stored at the system management server and/or router to indicate that the TBU application server is no longer accepting requests for the TBU software. Accordingly, when a new client's request for the TBU software is sent to the system management server, the Server List is consulted, and the request will be routed to an application server in the server cluster other than the TBU application server.

The next step is to determine whether the TBU application server is currently supporting a client request for the software, as shown at step 78. This needs to be determined because the TBU software cannot be upgraded if the TBU application server is still supporting active client requests for the TBU software. This can be determined by reference to the Session List, which tracks requests on a per application basis. If the TBU application server is currently servicing a request for the software, the system waits, as shown at step 80. When the TBU application server is no longer servicing a request for the TBU software, the TBU software program is no longer in use and is ready to be upgraded.

Accordingly, the software is upgraded on the TBU application server, as shown at step 82. This may be accomplished in any suitable manner, as is well-known in the art.

Finally, the router 30 is permitted to route new client requests for the software to the application server storing the now-upgraded software, as shown at step 34, and the process ends, as shown at step 35. This may be accomplished by modifying the Server List stored at the system management server and/or router to reflect that the application server is no longer inactive or quiesced for client requests for the upgraded software.

In this manner, clients' requests are continuously serviced, without interruption, during the upgrade process, and with an overall reduced burden on the distributed computing system, as compared with prior art methods.

In a preferred embodiment, these steps are carried out in an automated and systematic fashion by execution of a suitable computer software program such that upon completion of the upgrading of the software on a first application server, the method repeats for a second application server storing the to-be-upgraded software program. In this manner, the upgrade "ripples" across the server cluster.

It should be understood that the present invention can also be used to upgrade not only the application software stored by an application server but also the server software itself. In such an embodiment, application software code is analyzed to determine a Components list and information is stored in the Server List and Session List to reflect which components of the server software is or will be used by to service the client's requests. The TBU component is then treated like application software for the purpose of the upgrade process in accordance with the present invention. When the server software is stored on an application server, the components list is generated to reflect the relationship of the components and how they will be used to service clients' requests for software. The Components List is preferably stored on the system management server.

Figure 4:
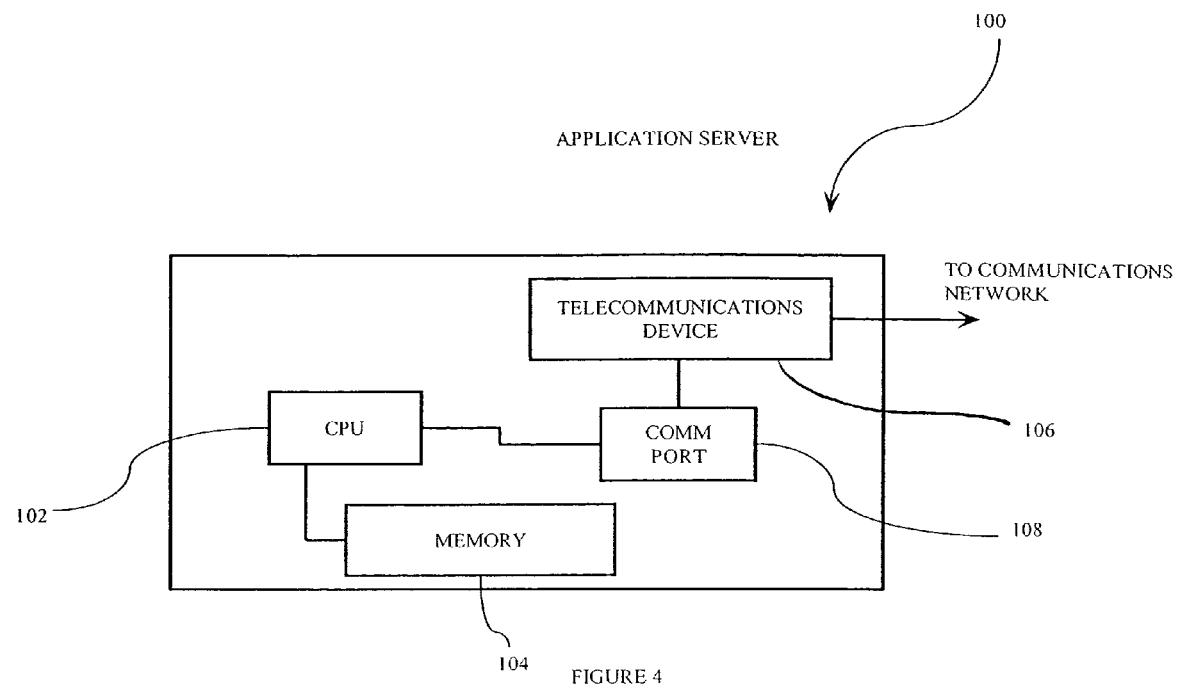
FIG. 4 is a block diagram of an application server in accordance with the present invention.

FIG. 4 is a block diagram of an application server in accordance with the present invention. The hardware of the application server is of a type generally known in the art. The application server 100 includes a central processing unit ("CPU") 102, a memory 104, e.g., random access memory ("RAM"), read only memory ("ROM") and/or a storage device such as a hard disk drive, and a telecommunications device 106 for communicating via a communications network, e.g., using TCP/IP technology. The telecommunications device may include a modem and/or a network card connected via a communications port 108. The application server may optionally include video display devices and/or input devices.

The application server 100 stores in its memory a first program for storing in said memory a list of active client requests supported by said application server, a second program for storing in said memory an identification of a computer program associated with each active client request, a third program for identifying a computer program upon receipt of a signal via said telecommunications device, and a fourth program for sending a signal via said telecommunications device when said application server is no longer supporting an active client request for said computer program.

Figure 5:
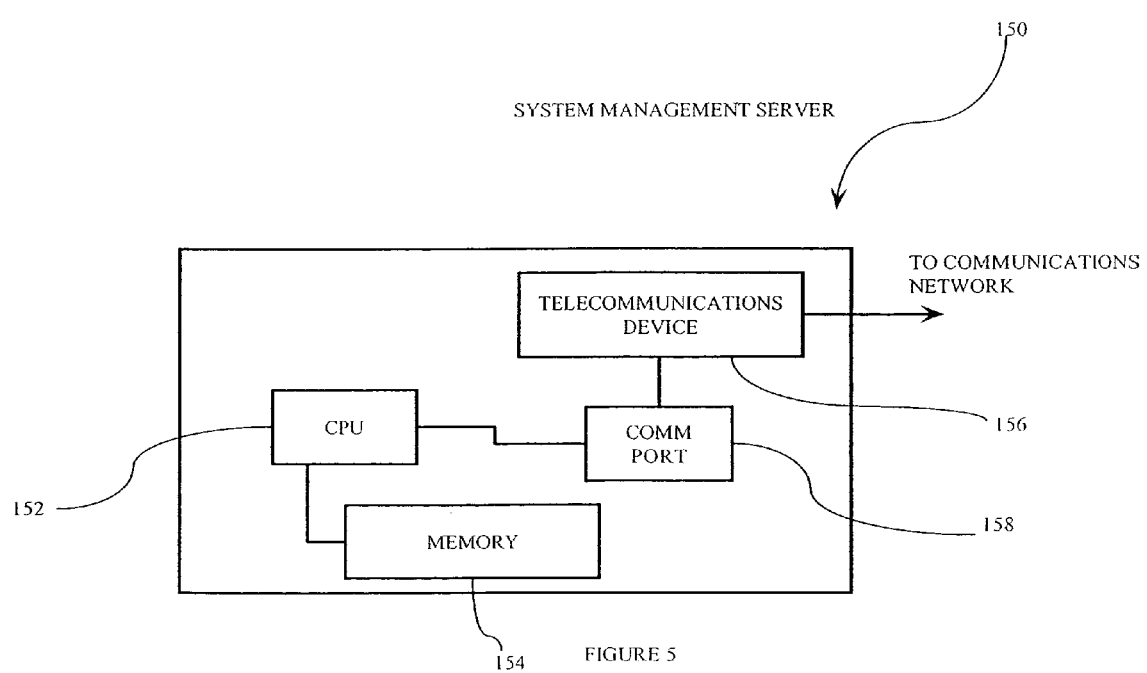
FIG. 5 is a block diagram of an application server in accordance with the present invention.

FIG. 5 is a block diagram of a system management server 150 in accordance with the present invention. The hardware of the system management server 150 is of the type generally known in the art. The system management server 150 includes a central processing unit ("CPU") 152, a memory 154, e.g., random access memory ("RAM"), read only memory ("ROM") and/or a storage device such as a hard disk drive, and a telecommunications device 156 for communicating via a communications network, e.g., using TCP/IP technology. The telecommunications device may include a modem and/or a network card connected via a communications port 158. The system management server 150 may optionally include video display devices and/or input devices.

The system management server 150 stores in its memory a first program for storing in said memory a list of application servers for servicing requests for a computer program, a second program for storing in said memory an identification of a computer program associated with each active client request, a third program for sending a signal via said telecommunications device to instruct a router to stop routing client requests for a particular computer program to a particular application server, and a fourth program for sending a signal via said telecommunications device to instruct a router to begin routing client requests for said particular computer program to said particular application server responsive to an indication that an upgrade process of said particular computer program on said particular application server is complete.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An application server for facilitating upgrading in a distributed computing environment, the application server comprising:

a central processing unit;

a memory operatively connected to said central processing unit;

a telecommunications device operatively connected to said central processing unit and capable of communicating via a communications network;

a first program stored in said memory and executable by said central processing unit, said first program being configured to store in said memory a list of active client requests supported by said application server;

a second program stored in said memory and executable by said central processing unit, said second program being configured to store in said memory an identification of a respective computer program for each active client request;

a third program stored in said memory and executable by said central processing unit, said third program being configured to identify an associated computer program for which the application server is presently supporting at least one active client request, said associated computer program being identified upon receipt of a first signal via said telecommunications device; and a fourth program stored in said memory and executable by said central processing unit, said fourth program being configured to send a second signal to begin upgrading of said associated computer program, said second signal being sent via said telecommunications device when said application server is no longer supporting any active client request for said associated computer program.

2. A system management server for facilitating upgrading in a distributed computing environment, the system management server comprising:

a central processing unit;

a memory operatively connected to said central processing unit;

a telecommunications device operatively connected to said central processing unit and capable of communicating via a communications network;

a first program stored in said memory and executable by said central processing unit, said first program being configured to store in said memory a list of application servers for servicing requests for each of a plurality of computer programs;

a second program stored in said memory and executable by said central processing unit, said second program being configured to store in said memory an identification of a respective computer program for each active client request;

a third program stored in said memory and executable by said central processing unit, said third program being configured to send a first signal via said telecommunications device to instruct a router to stop routing client requests for a particular computer program to a particular application server; and a fourth program stored in said memory and executable by said central processing unit, said fourth program being configured to send a second signal via said telecommunications device to instruct said router to begin routing client requests for said particular computer program to said particular application server responsive to an indication that an upgrade process of said particular computer program on said particular application server is complete.

3. A system management server for facilitating upgrading in a distributed computing environment, the system management server comprising:

a central processing unit;

a memory operatively connected to said central processing unit;

a telecommunications device operatively connected to said central processing unit and capable of communicating via a communications network;

a first program stored in said memory and executable by said central processing unit, said first program being configured to store in said memory a list of respective application servers for servicing requests for each of a plurality of computer programs;

a second program stored in said memory and executable by said central processing unit, said third program being configured to send a first signal via said telecommunications device to instruct a router to stop routing client requests for a particular computer program to a particular application server; and a third program stored in said memory and executable by said central processing unit, said fourth program being configured to send a second signal via said telecommunications device to instruct said router to begin routing client requests for said particular computer program to said particular application server responsive to an indication that an upgrade process of said particular computer program on said particular application server has been completed.

* * * * *